United States Patent
Kan et al.

(10) Patent No.: US 7,536,422 B2
(45) Date of Patent: May 19, 2009

(54) METHOD FOR PROCESS SUBSTITUTION ON A DATABASE MANAGEMENT SYSTEM

(75) Inventors: Masataka Kan, Yokohama (JP); Norihiro Hara, Kawasaki (JP); Katsushi Yako, Yokohama (JP); Tetsuya Suzuki, Yokohama (JP); Keisuke Matsubara, Yokohama (JP); Tooru Kawashima, Yokohama (JP); Masami Hikawa, Odawara (JP); Yoshihide Sato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 369 days.

(21) Appl. No.: 11/037,134

(22) Filed: Jan. 19, 2005

(65) Prior Publication Data
US 2005/0267888 A1    Dec. 1, 2005

(30) Foreign Application Priority Data
May 26, 2004    (JP)    ............................ 2004-155474

(51) Int. Cl.
G06F 17/30    (2006.01)
(52) U.S. Cl. ................. 707/202; 707/200; 707/203; 707/204
(58) Field of Classification Search ................ 707/200, 707/202, 203, 204
See application file for complete search history.

(56) References Cited

U.S. PATENT DOCUMENTS 6,880,002 B2 *    4/2005    Hirschfeld et al. .......... 709/223

2004/0243650 A1 *    12/2004    McCrory et al. ............ 707/203

FOREIGN PATENT DOCUMENTS

JP    200-137620    5/2000
JP    2002-351713    12/2002

OTHER PUBLICATIONS

Jim Gray and Andreas Reuter, "Transaction Processing: Concepts and Techniques", Morgan Kaufmann Publishers, 1993, pp. 925-927.
David Dewitt and Jim Gray, "Parallel Database Systems: the Future of Database Processing or a Passing Fad?", 1990, pp. 1-32.
Aslam Nomani, "Implementing IBM DB2 Universal Database V8.1 Enterprise Server Edition with Microsoft Cluster Server", International Business Machines Corporation, 2003.

* cited by examiner

Primary Examiner—Hosain T Alam
Assistant Examiner—Farhan M Syed
(74) Attorney, Agent, or Firm—Antonelli, Terry, Stout & Kraus, LLP.

(57) ABSTRACT

In a database management system using a shared-nothing architecture and adopting a system takeover in a DB storage area unit, correspondence information is provided which indicates a relation between a DB storage area and a DB processing server in charge of an access to the DB storage area, when a takeover occurs to some DB storage area, the correspondence information is changed in such a manner that an access process to the DB storage area is made in charge of another running DB processing server, and when some DB storage area is accessed in response to an inquiry request from a user, a DB processing server as an access request destination is determined by referring to the correspondence information.

9 Claims, 8 Drawing Sheets

| DB STORAGE AREA | EXECUTION REQUEST DESTINATION |
|---|---|
| DB STORAGE AREA 1 | DB PROCESSING SERVER A |
| DB STORAGE AREA 2 | DB PROCESSING SERVER A |
| DB STORAGE AREA 3 | DB PROCESSING SERVER B |
| DB STORAGE AREA 4 | DB PROCESSING SERVER B |
| DB STORAGE AREA 5 | DB PROCESSING SERVER C |
| DB STORAGE AREA 6 | DB PROCESSING SERVER C |

| DB STORAGE AREA | EXECUTION REQUEST DESTINATION |
|---|---|
| DB STORAGE AREA 1 | DB PROCESSING SERVER A |
| DB STORAGE AREA 2 | DB PROCESSING SERVER A |
| DB STORAGE AREA 3 | DB PROCESSING SERVER A |
| DB STORAGE AREA 4 | DB PROCESSING SERVER C |
| DB STORAGE AREA 5 | DB PROCESSING SERVER C |
| DB STORAGE AREA 6 | DB PROCESSING SERVER C |

| DB STORAGE AREA | PROCESS STATE | BELONGING DB PROCESSING SERVER |
|---|---|---|
| DB STORAGE AREA 1 | IN EXECUTION | DB PROCESSING SERVER A |
| DB STORAGE AREA 2 | IN EXECUTION | DB PROCESSING SERVER A |
| DB STORAGE AREA 3 | IN STANDBY | DB PROCESSING SERVER B |
| DB STORAGE AREA 4 | IN STANDBY | DB PROCESSING SERVER B |
| DB STORAGE AREA 5 | IN STANDBY | DB PROCESSING SERVER C |
| DB STORAGE AREA 6 | IN STANDBY | DB PROCESSING SERVER C |

| DB STORAGE AREA | PROCESS STATE | BELONGING DB PROCESSING SERVER |
|---|---|---|
| DB STORAGE AREA 1 | IN EXECUTION | DB PROCESSING SERVER A |
| DB STORAGE AREA 2 | IN EXECUTION | DB PROCESSING SERVER A |
| DB STORAGE AREA 3 | IN SUBSTITUTION | DB PROCESSING SERVER B |
| DB STORAGE AREA 4 | IN STANDBY | DB PROCESSING SERVER B |
| DB STORAGE AREA 5 | IN STANDBY | DB PROCESSING SERVER C |
| DB STORAGE AREA 6 | IN STANDBY | DB PROCESSING SERVER C |

2702

US 7,536,422 B2

METHOD FOR PROCESS SUBSTITUTION ON A DATABASE MANAGEMENT SYSTEM

INCORPORATION BY REFERENCE

The present application claims priority from Japanese application JP 2004-155474 filed on May 26, 2004, the content of which is hereby incorporated by reference into this application.

BACKGROUND OF THE INVENTION

1. Field of the Invention

The present invention relates to a data processing method for a database management system of a parallel server configuration, and more particularly to a method of substituting for a database process when a failure occurs.

2. Description of the Related Art

Non-stop business requiring a system operation of 24 hours 365 days needs a high availability database management as data infrastructure which can support such business. There is the tendency that an amount of data processed in business increases, and a system scalability capable of dealing with an increase in business amount and data amount is an important issue of a database management system.

Techniques called system takeover have been used as a means for improving the availability of a database management system. System takeover is the techniques that when a machine fails, its process is substituted by another machine to continue services and shorten a service stop time due to the failure.

In a database management system adopting the system takeover, a machine to be substituted when a failure occurs is defined for each machine under execution of a process. An execution environment of a machine executing a process is called an execution system, and an execution environment of a machine to be substituted is called a standby system. An execution environment which is the active system when a system starts, is called an active system, and an execution environment which is the standby system when a system starts, is called a reserved system. In a system adopting the system takeover, when a system takeover function detects a failure of the execution system, the system takeover to the standby system starts. As the system takeover starts, resources of the execution system such as disks storing a database and addresses of networks are switched to the standby system. Upon completion of switching the resources, the standby system starts receiving database services inherited from the execution system to complete the system takeover. At this stage, the execution environment which was the standby system before the takeover becomes the execution system.

These techniques are described in "TRANSACTION PROCESSING: CONCEPTS AND TECHNIQUES", Jim Gray and Andreas Reuter, Morgan Kaufmann Publishers, 1993.

If importance is attached to scalability of a database management system, the system is configured by a plurality of servers and the servers process data in parallel. As a parallel processing architecture to be adopted in this case, a shared-nothing architecture is known.

In the shared-nothing architecture, servers will not share CPUs, disks and caches of a parallel server configuration system. Data is divided into logical segments which are stored in exclusive DB storage areas, and each DB storage area is allowed to be accessed only by a corresponding server. With this architecture, there is no resource contention between servers so that each server can execute a process such as a search and update simultaneously and a process performance matching the number of servers can be realized. As a consequence, business transactions can be performed smoothly even if the amount of businesses and data increases.

These techniques are described in "Parallel Database Systems: the Future of Database Processing or a Passing Fad?", David Dewitt and Jim Gray, SIGMOD Record, Vol. 19, No. 4, pp. 104-112, 1990.

Also in a system adopting the shared-nothing architecture, the system takeover techniques are often used in order to provide high availability.

For the system takeover, the execution system and standby system are generally defined for each DB processing server. The running state of each DB processing server is surveyed and the system takeover to the standby system is performed when necessary. Namely, the system takeover is performed in the unit of DB processing server. The standby system of each DB processing server is often the same machine as that of the execution system of another DB processing server. In this case, the machine as the standby system executes a twofold of a normal process after the system changeover.

"Implementing IBM DB2 Universal Database V8.1 Enterprise Server Edition with Microsoft Cluster Server", Aslam Nomani, International Business Machines Corporation, 2003 discloses a system takeover method (load balanced type system takeover) using a DB storage area as a takeover unit in a database management system disposing a plurality of DB storage areas in each machine. The execution system and standby system are defined for each DB storage area. In a normal state, the execution system accesses the DB storage area, and when a failure occurs, the standby system accesses the DB storage area to continue services.

With this method, a plurality of DB storage areas belonging to the same machine are distributed to different machines to define the standby system. When a failure occurs in one machine, a plurality of DB storage areas belonging to the machine are inherited to different machines. It is therefore possible to distribute a process execution load after the system takeover to a plurality of machines and alleviate a low throughput of the whole system.

SUMMARY OF THE INVENTION

Since the load balanced type system takeover is performed in the unit of DB storage area, the number of standby system becomes larger than that of the system takeover in the unit of DB processing server. In a system adopting the load balanced type system takeover, one execution system is generally provided with a plurality of standby systems in order to deal with multiple failures. In this case, the number of standby system increases further.

The document of Aslam Nomani describes that in configuring a system adopting the system takeover, resources (processes, memories and the like) are required to be prepared on the assumption that all system operate as the execution system on one machine. Therefore, as the number of standby system to be disposed in a machine becomes large, the necessary amount of resources increases and the system configuration cost increases.

Since the number of resources to be managed increases as the number of standby system increases, the system management cost increases.

Namely, although the conventional load balanced type system takeover method has the advantage that a load after the system takeover can be distributed to a plurality of machines, the number of standby system to be defined in the system increases, resulting in the problem of an increase in the system configuration cost and system management cost.

An object of this invention is to provide a system takeover method capable of load distribution without exclusive resources of the standby system and without management of the standby system, in a database management system using a shared-nothing architecture.

The present invention solves the above-described issues by the following means.

In a database management system adopting a system takeover in a DB storage area unit, correspondence information is provided which indicates a relation between a DB storage area and a DB processing server in charge of an access to the DB storage area, when a takeover occurs to some DB storage area, the correspondence information is changed in such a manner that an access process to the DB storage area is made in charge of another running DB processing server, and when some DB storage area is accessed in response to an inquiry request from a user, a DB processing server as an access request destination is determined by referring to the correspondence information.

With this method, upon the system takeover in the DB storage area unit, DB processing servers under operation can be used as the standby system for a plurality of DB storage areas. Resources for the standby system are therefore unnecessary, and individual management of the standby system is unnecessary.

According to the present invention, in a database management system using a shared-nothing architecture, the amount of necessary resources and the standby system management cost can be reduced when a system takeover capable of load distribution is performed.

Other objects, features and advantages of the invention will become apparent from the following description of the embodiments of the invention taken in conjunction with the accompanying drawings.

DESCRIPTION OF THE EMBODIMENT

An example of embodiment of the invention will be described specifically with reference to the accompanying drawings.

First, with reference to FIG. 1, the concept of the present invention will be described.

A database management system of an embodiment is constituted of a plurality of machines: a machine #1 100, a machine #2 101, a machine #2 102 and a machine #3 103.

A process request receiving server 110 runs on the machine #0 100. A DB processing server A 111, a DB processing server B 112 and a DB processing server C 113 run on the machine #1 101, machine #2 102 and machine #3 103, respectively. A server is intended to mean an execution environment of database processing constituted of a process group, a memory area and the like.

The process request receiving server receives an inquiry 130 from a user, analyzes it, generates a DB processing execution request, and issues it to the DB processing server. The result of DB processing is returned to the user if necessary.

The DB processing server receives a DB processing execution request from the process request receiving server, processes data in a DB storage area, and returns the execution result to the process request receiving server if necessary.

The machine #1 101, machine #2 102 and machine #3 103 each have a system takeover function 114. The system takeover function registers each DB storage area as a surveyance target to realize the system takeover in a DB storage area unit.

An architecture of the database management system of the embodiment is a shared-nothing architecture. A database (e.g., table, index) to be managed by the system is divided into a plurality of division tables and division indices by various methods and divisionally stored in a plurality of DB storage areas. Each DB storage area is assigned to a predetermined DB processing server, and the DB processing server accesses data (e.g., table data, index data) in only the DB storage area assigned to the DB processing server.

Figure 1:
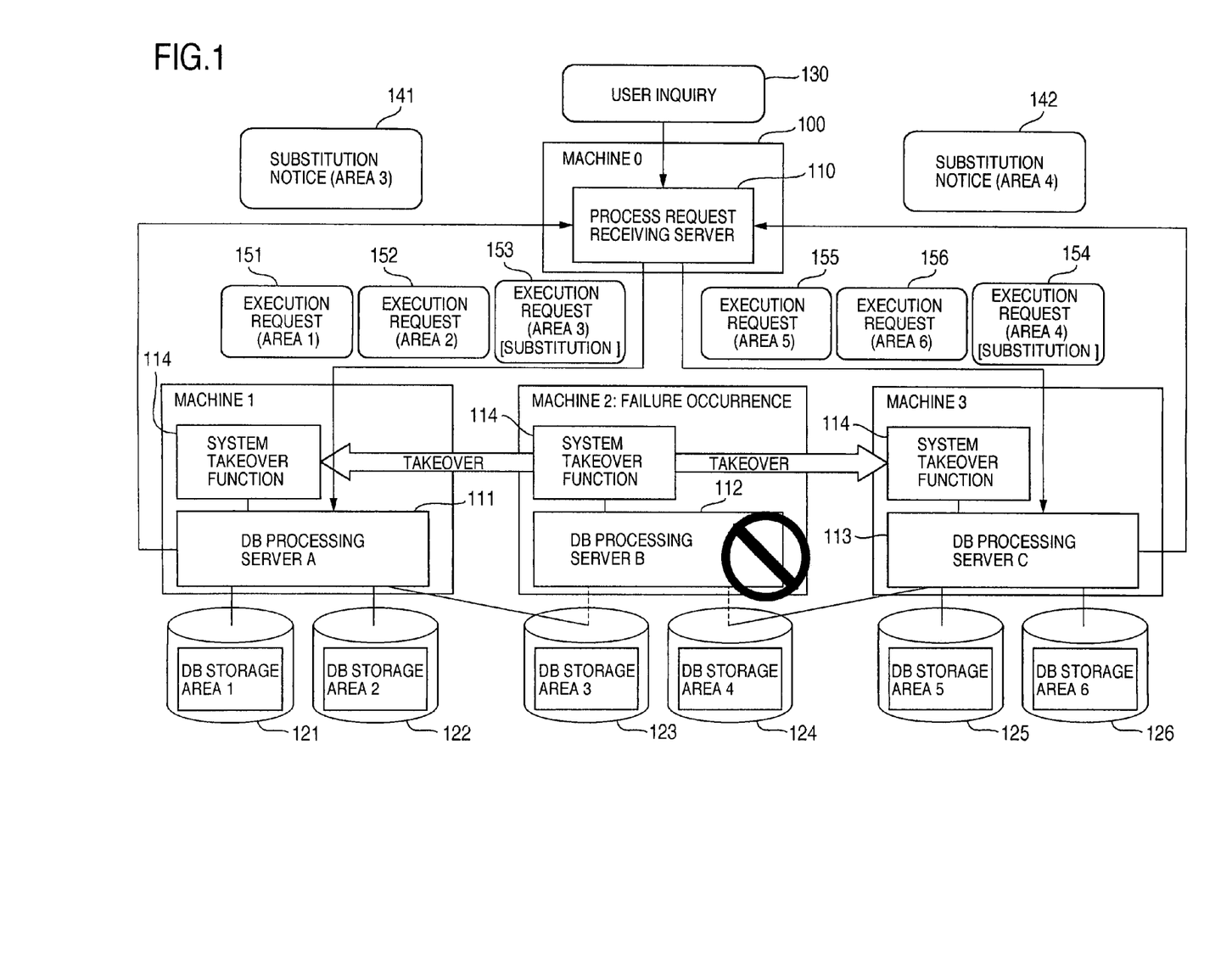
FIG. 1 is a conceptual diagram showing an example of an embodiment of the present invention.

In the example shown in FIG. 1, in a normal state, a DB storage area #1 121 and a DB storage area #2 122 are assigned to the DB processing server A 111, a DB storage area #3 123 and a DB storage area #2 124 are assigned to the DB processing server B 112, and a DB storage area #5 125 and a DB storage area #6 126 are assigned to the DB processing server C 113. Namely, the DB processing server A 111 executes processing only for the DB process execution request to the DB storage area #1 121 and DB storage area #2 122, the DB processing server B 112 executes processing only for the DB process execution request to the DB storage area #3 123 and DB storage area #4 124, and the DB processing server C 113 executes processing only for the DB process execution request to the DB storage area #5 125 and DB storage area #6 126. The DB processing server A 111, DB processing server B 112 and DB processing server C 113 will not access the same DB storage area.

The DB processing server A 111 operates also as the standby system of the DB storage area #3 123, and the DB processing server C 113 operates also as the standby system of the DB storage area #4 124. Namely, the DB server running as the execution system of a particular DB storage area is used as the standby system of another DB storage area.

For example, if the DB processing server B 112 becomes down, the system takeover function 114 of the machine #2 102 detects this down, and requests the takeover to the system takeover functions 114 of the machine #1 101 and machine #3

103 to switch the DB storage area #3 123 and DB storage area #4 124 to the machine #1 101 and machine 2 102, respectively.

Upon reception of a takeover request from the machine #2 102, the machine #1 101 assigns the DB storage area #3 123 to the DB processing server A 111 and transmits a substitution notice 142 of the DB storage area #3 123 to the process request receiving server 110. Similarly, the machine #3 103 assigns the DB storage area #4 124 to the DB processing server C 113 and transmits a substitution notice 142 of the DB storage area #4 124 to the process request receiving server 110.

The process request receiving server 110 received the inquiry 130 from the user analyzes the inquiry, determines the DB storage area storing the data to be accessed, and transmits an execution process request to the DB processing server in charge of the DB storage area. If the DB processing server B 112 becomes down, the execution request having the DB storage area #3 123 as an access destination is transmitted to the DB processing server A 111, whereas the execution request having the DB storage area #4 124 as an access destination is transmitted to the DB processing server C 113.

The DB processing server A 111 normally receives execution requests (151 and 152) for the DB storage area #1 121 and DB storage area #2 122 and accesses these DB storage areas. If the DB processing server B 112 becomes down, the DB processing server A 111 also receives an execution request 153 simultaneously and substitutes the access process to the DB storage area #3 123.

The DB processing server C 113 normally receives execution requests (155 and 156) for the DB storage area #5 125 and DB storage area #6 126 and accesses these DB storage areas. If the DB processing server B 112 becomes down, the DB processing server C 113 also receives an execution request 154 simultaneously and substitutes the access process to the DB storage area #4 124.

In this case, the DB processing server A 111 and DB processing server C 113 execute the substitution process by substituting the already existing process without generating a new process. A data buffer for the already existing process is shared.

As described above, a plurality of DB processing servers under operation divisionally substitute the process of the down DB processing server in the DB storage area unit. It is therefore possible to realize the load distributed type system takeover, without having exclusive resources of the standby system and without separate management of the standby system.

Next, with reference to FIG. 2, description will be made on the configuration of a system executing database processing of the embodiment.

A computer system of this example includes information processing apparatuses 2000, 2100 and 2200.

The information processing apparatus 2000 is constituted of a CPU 2001, a main storage 2002, a communication control device 2003, an I/O control device 2004 and a terminal 2005. The main storage 2001 stores an application program 2006 which is run by CPU 2001. As the application program 2006 issues an inquiry to the information processing apparatus 2100, an inquiry request is transmitted via a network 2500 to the database management system by the communication control device 2003 of the information processing apparatus 2000 and a communication control device 2103 of the information processing apparatus 2100.

The information processing apparatus 2100 is constituted of a CPU 2101, a main storage 2102, the communication control device 2103, an I/O control device 2104, a terminal 2105 and an external storage device 2600 such as a magnetic disk device. The process request receiving server 110 of the database management system is placed on the main storage 2102 and run by CPU 2101. The external storage device 2600 stores a processing program realizing the process request receiving server 110 and a substitution destination information table 2602.

The process request receiving server 110 performs data read/write of the external storage device 2600 by using the I/O control device 2104, and performs data transmission/reception to/from an information processing apparatus connected by the network 2500 by using the communication control device 2103. The process request receiving server 110 transmits a DB processing execution request to the information processing apparatus 2200 connected to the network 2500 by using the communication control device 2103.

The information processing apparatus 2200 is constituted of a CPU 2201, a main storage 2202, the communication control device 2203, an I/O control device 2204, a terminal 2205 and external storage device 2700, 2800 and 2810 such as a magnetic disk device. One of the DB processing server A 111, DB processing server B 112 and DB processing server C 113 of the database management system and the system takeover function 114 are placed on the main storage 2202 and run by CPU 2201. A buffer 2208 used for accessing the database is also placed on the main storage 2202. One of the DB processing server A 111, DB processing server B 112 and DB processing server C 113, a processing program 2701 and a substitution control information table 2702 for realizing the system takeover function 114 are placed on the external storage device 2700. A DB storage area 2801 is stored in the external storage device 2800. A DB storage area 2811 is set in the external storage device 2810. The database storage areas 2801 and 2811 permanently or temporarily store data to be accessed in the database management system. The DB processing server A 111, DB processing server B 112 and DB processing server C 113 perform data read/write of the external storage device 2700, 2800 and 2810 by using the I/O control device, and performs data transmission/reception to/from the information processing apparatus connected to the network 2500 by using the communication control device 2203. The external storage device 2800 and 2810 assigned to the information processing apparatus 2200 are shared disks, and can be accessed also from another information processing apparatus 2200. Access control of the shared disks is performed by the system takeover function 114.

Figure 3:
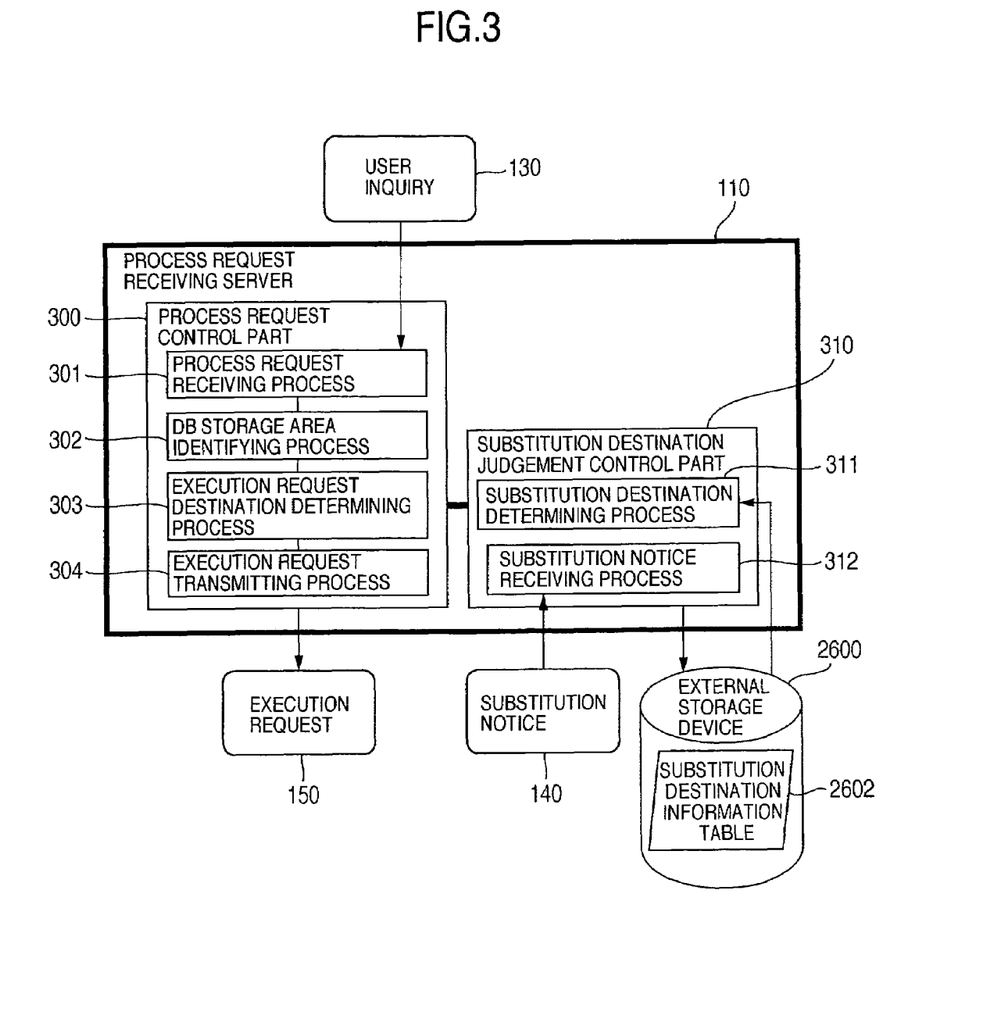
FIG. 3 is a diagram showing the functional structure of a process request receiving server according to the embodiment of the present invention.

FIG. 3 is a diagram showing the outline structure of the process request receiving server 110 of the embodiment. The process request receiving server 110 includes a process request control part 300 and a substitution destination judgement control part 310.

The process request control part 300 receives an inquiry 130 from a user (301), analyzes the inquiry request to identify the DB storage area storing the data to be accessed (302), inquires the substitution destination judgement control part 310 about a processing execution request destination for the DB storage area to determine a DB processing execution request destination (303), and transmits an execution request 150 to the determined request destination (DB processing server) (304).

Upon reception of the inquiry from the process request control part 300, the substitution destination judgement control part 310 refers to the substitution destination information table 2602 in the external storage device 2600 to determine and notify a DB processing execution request destination (DB processing server) (311). Upon reception of a substitution notice 140 from the DB processing server, the substitution destination judgement control part 310 registers substitution destination information in the substitution destination information table 2602 in the external storage device 2600 (312).

Figure 4:
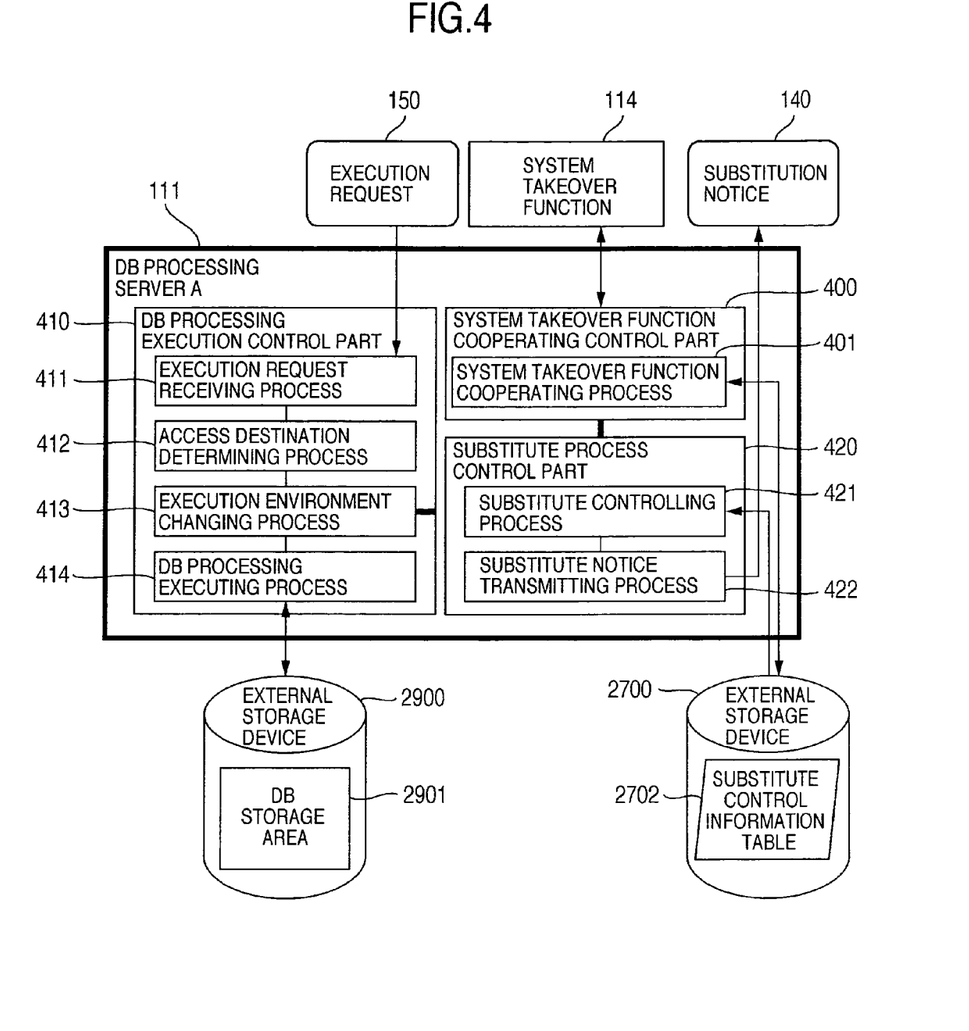
FIG. 4 is a diagram showing the functional structure of a DB processing server according to the embodiment of the present invention.

FIG. 4 is a diagram showing the outline structure of the DB processing server A (111) of the embodiment.

The DB processing server A 111 includes a system takeover function cooperating control part 400, a DB processing execution control part 410 and a substitution processing control part 420. The system takeover function cooperating control part 400 together with the substitution processing control part 420 provides a system takeover function cooperating function, and the DB processing execution control part 410 together with the substitution processing control part 420 provides a DB processing execution function.

The system takeover function cooperating control part 400 together with the system takeover function 114 controls switching between the DB storage areas (401). The system takeover function cooperating control part refers to the substitution control information table in the external storage device 2700 to judge the processing state of the DB storage area, and notifies the system takeover function of the state of each DB storage area. When a DB processing server failure is detected, a system takeover is requested to the system takeover function 114. When a takeover request is received from the system takeover function 114, the substitution state is registered in the substitution control information table 2702 in the external storage device 2700 and the substitution processing control part 420 is instructed to transmit a substitution notice 140.

The DB processing execution control part 410 receives an execution request 150 (411), determines the DB storage area to be accessed (412), if the access destination is the DB storage area to be substituted, inquires the substitution processing control part 420 about the DB processing server to which the DB storage area belongs, changes the execution environment to the environment matching the substitution processing (413), and accesses the DB storage area 2901 in the external storage device 2900 to execute DB processing (414).

Upon reception of the inquiry from the DB processing execution control part 410, the substitution processing control part 420 refers to the substitution control information table 2702 in the external storage device 2700 to identify and notify the DB processing server to which the DB storage area to be accessed belongs (421). Upon reception of an instruction from the system takeover function cooperating control part 400, the substitution processing control part transmits a substitution notice 140 to the DB processing server, by referring to the substitution control information table 2702 in the external storage device 2700.

The DB processing server B 112 and DB processing server C 113 have the similar structure as that of the DB processing server A 111.

Figure 5:
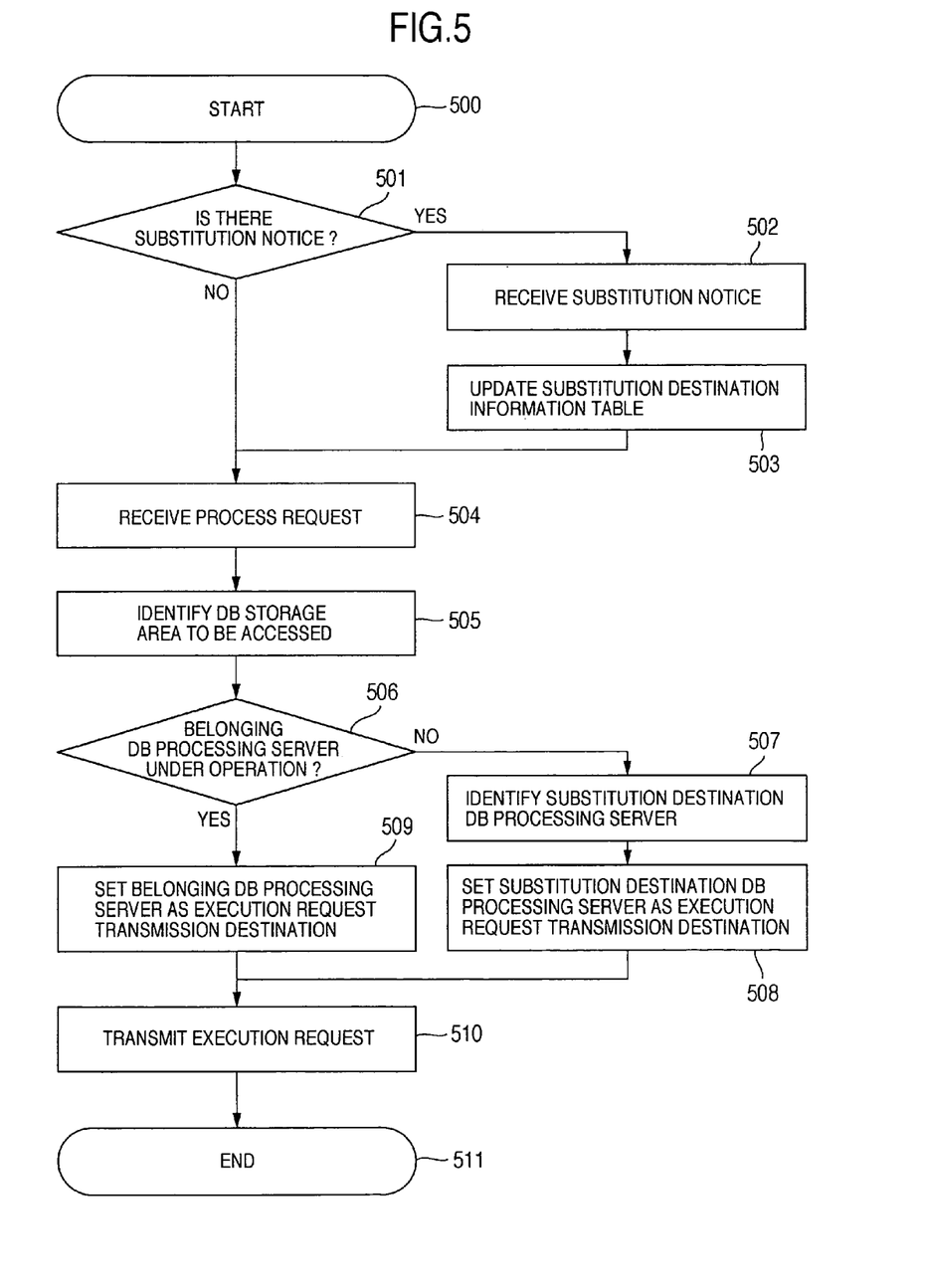
FIG. 5 is a flow chart illustrating the process sequence of the process request receiving server according to the embodiment of the present invention.

FIG. 5 is a flow chart illustrating a process sequence of the process request receiving server 110.

First, at Step 501, it is judged whether there is a substitution notice. If there is a substitution notice, the flow advances to Step S502, whereas there is no substitution notice, the flow advances to Step 504.

At Step 502, the substitution notice is checked to identify a DB storage area to which an execution request destination is changed, and the process execution request destination (DB processing server) to thereafter advance to Step 503.

At Step 503, execution request destination information (DB processing server name) regarding the DB storage area to which the execution request destination is changed and which was identified at Step 502, is registered in the substitution destination information table 2602 in the external storage device 2600, to thereafter advance to Step 504. At Step 504, an inquiry from a user is received, and at Step 505 the inquiry received at Step 504 is analyzed to identify the DB storage area to be accessed, to thereafter advance to Step 506.

At Step 506, it is judged whether the DB processing server, to which the DB processing area identified at Step 505 belongs, is under operation. If not under operation, the flow advances to Step 507, whereas if under operation, the flow advances to Step 509.

At Step 507, the substitution destination information table 2602 in the external storage device unit 2600 is checked to identify a substitution destination DB processing server corresponding to the DB storage area to be accessed, and at Step 508 the substitution destination DB processing server identified at Step 507 is set as an execution request transmission destination, to thereafter advance to Step 510.

At Step 509, the DB processing server to which the DB storage area belongs is set as the execution request transmission destination to thereafter advance to Step 510.

At Step 510, the DB processing execution request is transmitted to the execution request transmission destination set at Step 508 or 509, to thereafter advance to Step 511 and terminate the process sequence.

Figure 6:
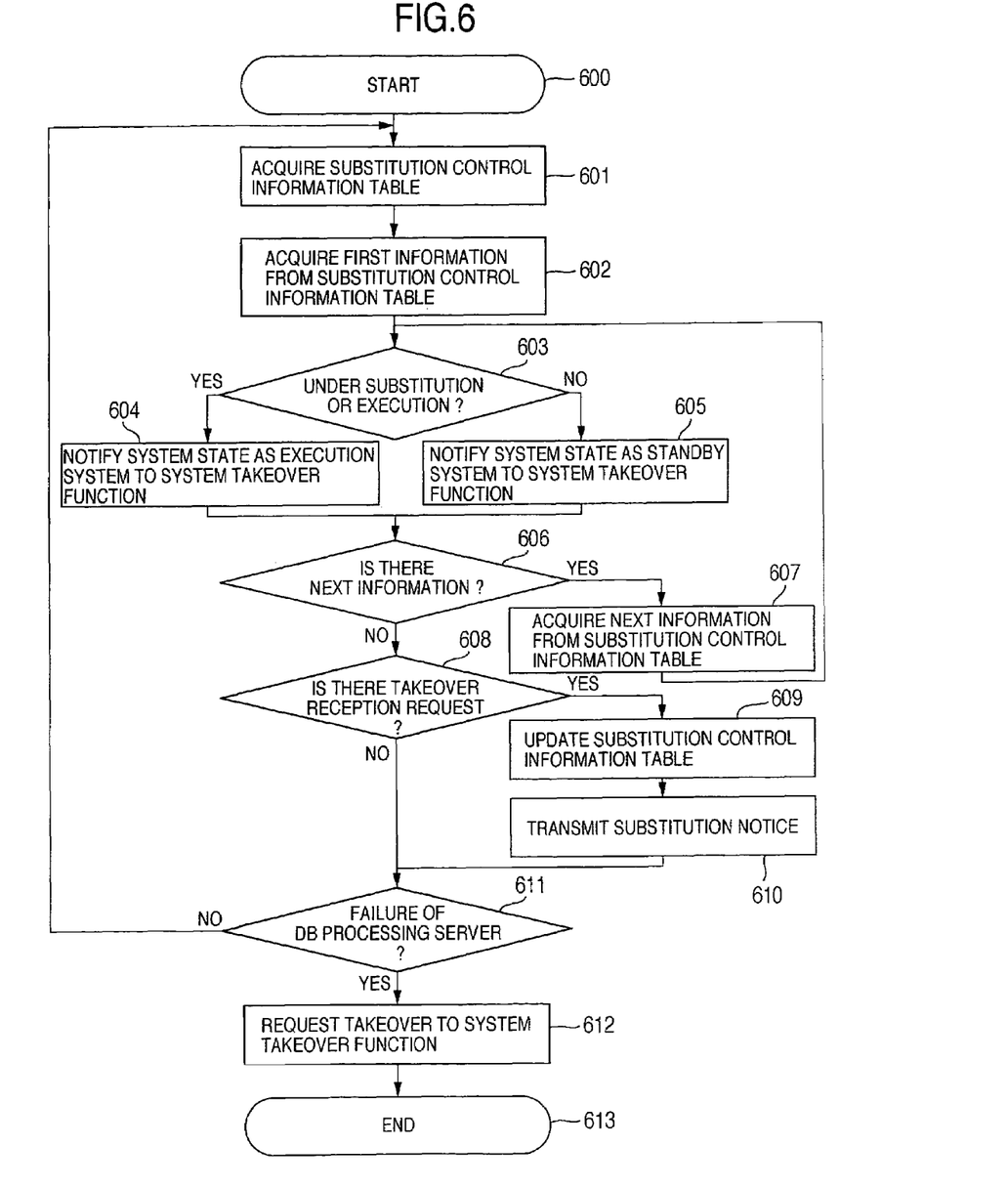
FIG. 6 is a flow chart illustrating the process sequence of a system takeover function coordinating function of the DB processing server according to the embodiment of the present invention.

FIG. 6 is a flow chart illustrating a process sequence of the DB processing execution function of the DB processing server A 111, DB processing server B 112 and DB processing server C 113.

First, at Step 601, the substitution control information table 2702 in the external storage device 2700 is acquired to thereafter advance to Step 602.

At Step 602, first substitution control information is acquired from the substitution control information table 2702 acquired at Step 601 to thereafter advance to Step 603.

At Step 603, the acquired substitution control information is checked to judge the process state of the corresponding DB storage area. If the process state is under execution or under substitution, the flow advances to Step 604, whereas if the process state is neither under execution nor under substitution, the flow advances to Step 605.

At Step 604, the system takeover function 114 is notified of that the execution system for the DB storage area whose process state was judged at Step 603 is the subject DB processing server, to thereafter advance to step 606.

At Step 605, the system takeover function 114 is notified of that the standby system for the DB storage area whose process state was judged at Step 603 is the subject DB processing server, to thereafter advance to Step 606.

At Step 606, it is judged whether there is next information in the substitution control information table 2702. If there is next information, the flow advances to Step 607, whereas if there is no next information, the flow advances to Step 608.

At Step 607, next information is acquired from the substitution control information table 2702 to thereafter return to Step 603.

At Step 608, it is judged whether there is a takeover reception request from the system takeover function 114. If there is the takeover reception request, the flow advances to Step 609, whereas if not, the flow advances to Step 611.

In this embodiment, although the system takeover is received in response to a takeover reception request from the system takeover function, at Step 608 another takeover destination may be determined from the process state of another DB processing server, and the other takeover destination is notified to the system takeover function to deny the takeover reception request.

At Step 609, the process state of the DB storage area to which the takeover is passed, is changed to "IN SUBSTITUTION" in the substitution control information table 2702 to thereafter advance to Step 610.

At Step 610, the substitution processing control part 420 is instructed to transmit the substitution notice for the DB storage area to which the takeover is passed, to the process request receiving server to thereafter advance to Step 611.

At Step 611, a failure occurrence state of the DB processing server is judged. If a failure does not occur, the flow returns to Step 601, whereas if a failure is occurring, the flow advances to Step 612.

At Step 612, a system takeover request to the DB storage area in execution or in substitution by the DB processing server is transmitted to the system takeover function 114 to thereafter advance to Step 613 and terminate the process sequence.

In this embodiment, although the system takeover function determines the takeover destination, at Step 612 another takeover destination may be determined from the operation state of another DB processing server, and the determined takeover destination may be notified to the system takeover function.

Figure 7:
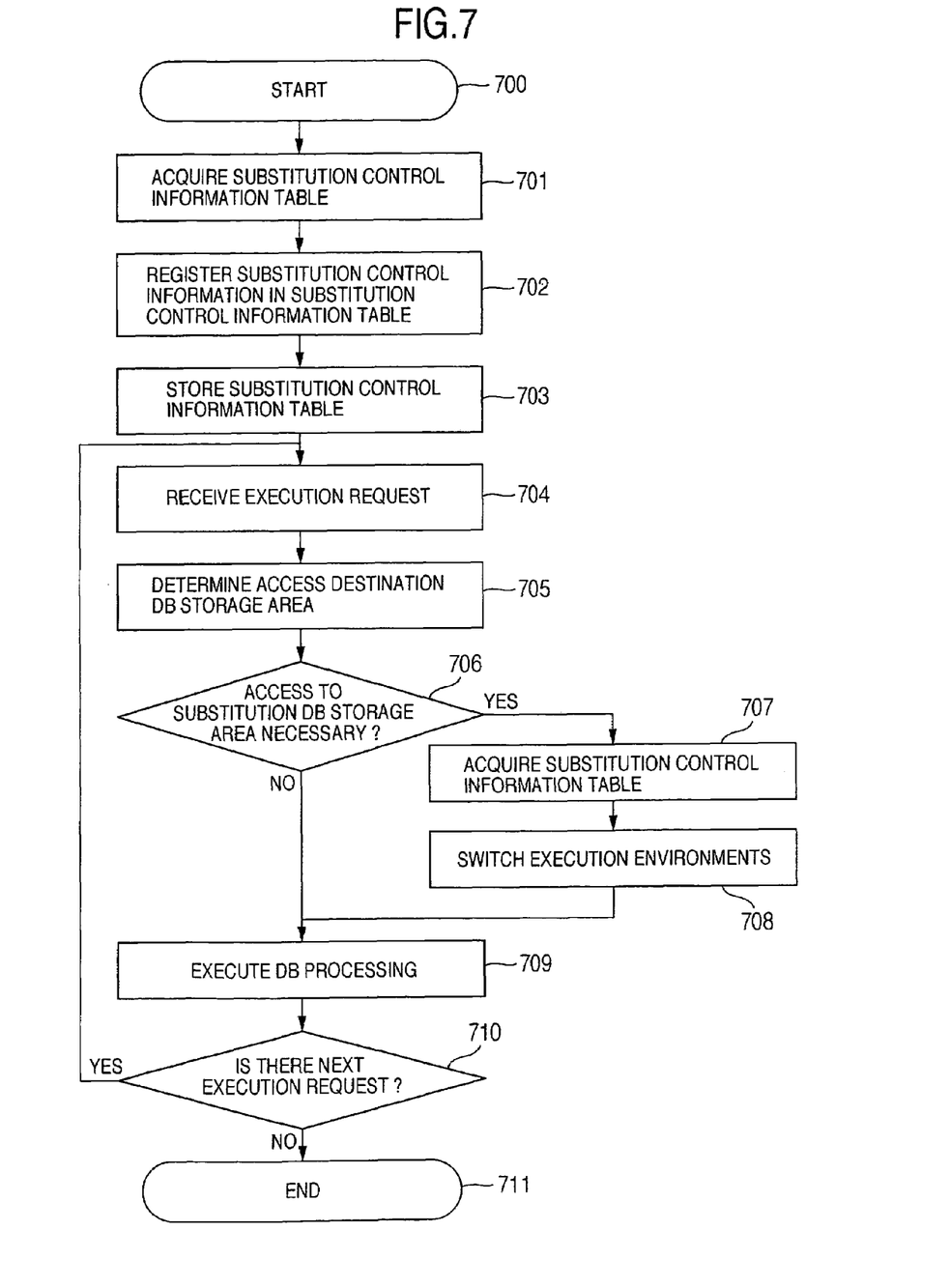
FIG. 7 is a flow chart illustrating the process sequence of a DB processing execution function of the DB processing server according to the embodiment of the present invention.

FIG. 7 is a flow chart illustrating the process sequence of the system takeover function cooperating function of the DB processing server A 111, DB processing server B 112, and DB processing server C 113.

First, at Step 701, the substitution control information table 2702 in the external storage device 2700 is acquired to thereafter advance to Step 702.

At Step 702, the DB processing server to which each DB storage area belongs, is identified and reflected upon the substitution control information, and the substitution control information is registered in the substitution control information table 2702 to thereafter advance to Step 703.

At Step 703, the substitution control information table 2702 registering the substitution control information at Step 702 is loaded in the external storage device 2700 to thereafter advance to Step 704.

Next, at Step 704, an execution request from the process request receiving server is received to thereafter advance to Step 705.

At Step 705, the execution request received at Step 704 is analyzed to determine an access destination DB storage area to thereafter advance to Step 706.

At Step 706, it is judged whether the DB storage area is a DB storage area to be substituted. If it is the DB storage area to be substituted, the flow advances to Step 707, whereas if not, the flow advances to Step 709.

At Step 707, the substitute control information table 2702 in the external storage device 2700 is acquired to thereafter advance to Step 708.

At Step 708, the substitution control information table 2702 is checked to identify the DB processing server to which the DB storage area to be accessed belongs, and the execution environment of the DB processing server process is changed to an execution environment of a substitution process to thereafter advance to Step 709.

At Step 709, DB processing is executed by accessing the DB storage area to thereafter advance to Step 710.

At Step 710, it is judged whether there is a next execution request. If there is a next execution request, the flow returns to Step 704, whereas if not, the flow advances to Step 711 and terminate the process sequence.

Figure 8A:
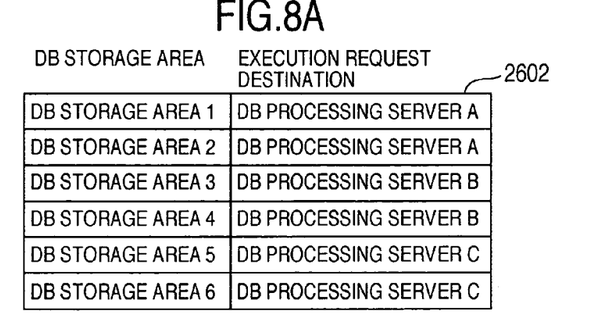
FIGS. 8A and 8B are diagrams showing substitution destination information tables according to the embodiment of the present invention.
Figure 8B:
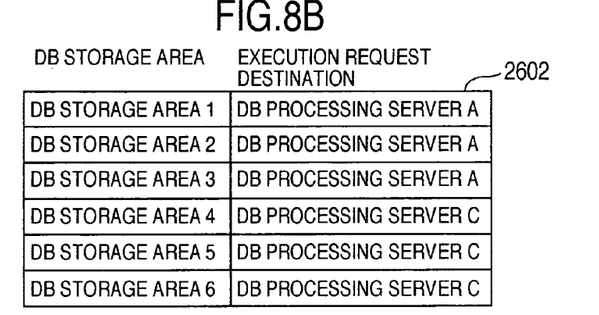

FIGS. 8A and 8B show examples of the substitution destination information table of the embodiment. The substitution destination information table is a table for registering a transmission destination of a DB processing execution request to each DB storage area.

The substitution destination information table shown in FIG. 8A is a table indicating that all DB processing servers in the database management system are in operation. Information registered in this table is system initial setting values. The initial setting values are set by the system in accordance with the system configuration, when the system is configured or the system is started up. The DB processing server A is registered as the execution request destination of the DB storage area #1 and DB storage area #2, the DB processing server B is registered as the execution request destination of the DB storage area #3 and DB storage area #4, and the DB processing server C is registered as the execution request destination of the DB storage area #5 and DB storage area #6.

The substitution destination information table shown in FIG. 8B is a table after the DB processing server B becomes down. Information registered in this table is the initial setting values changed in accordance with a substitution notice received from each DB processing server. The DB processing server A is registered similar to the normal case as the execution request destination of the DB storage area #1 and DB storage area #2, and the DB processing server C is registered similar to the normal case as the execution request destination of the DB storage area #5 and DB storage area #6. The DB processing server A as a substitution server is registered as the execution request destination of the DB storage area #3 because the DB processing server B is down. The DB processing server C as a substitution server is registered as the execution request destination of the DB storage area #4 because the DB processing server B is down.

The information registered in the substitution destination information table can be confirmed by an operation state confirmation command or the like of the database management system.

Figure 9A:
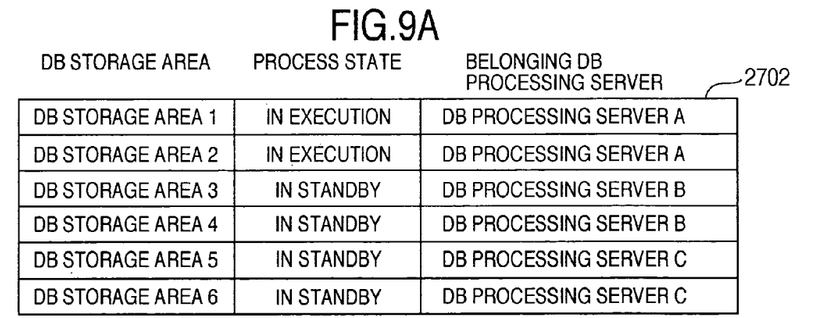
FIGS. 9A and 9B are diagrams showing substitution control information tables according to the embodiment of the present invention.
Figure 9B:
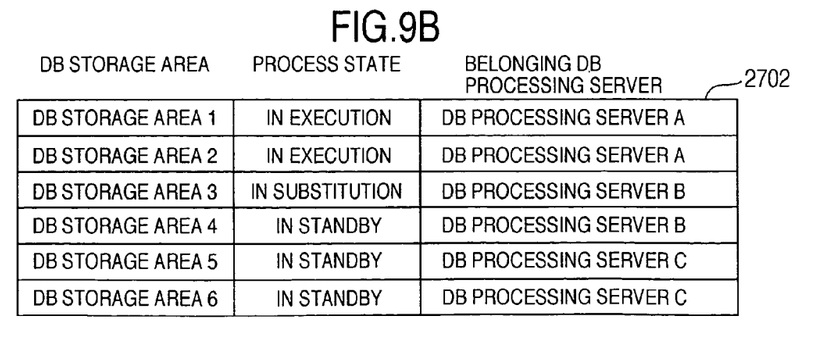

FIGS. 9A and 9B show examples of the substitution control information table of the embodiment. The substitution control information table is a table for registering the system state and execution environment information (belonging DB processing server) of the DB processing server for each DB storage area.

The substitution control information table shown in FIG. 9A is a table for the DB processing server A when all DB processing servers in the database management system are in operation. Information registered in this table is system initial setting values. The initial setting values are set by a user, when the system is configured or the system is started up. The user determines for each DB storage area the DB processing server (belonging DB processing server) to be used as the active system and the DB processing server (substitution DB processing server) to be used as the reserved system. In accordance with this determination, "IN EXECUTION" is registered in the system state (process state) for the DB storage area which uses the DB processing server A as the active system, and the DB processing server A is registered as the belonging DB processing server, and "IN STANDBY" is registered in the system state (process state) for the DB storage area which uses the DB processing server A as the reserved system, and the DB processing server as the active system is registered as the belonging DB processing server. In the similar manner, the initial setting values are required to be registered for the DB processing server B and DB processing server C. In this embodiment, although a user registers the initial setting values, they may be automatically determined by the system.

In FIG. 9A, "IN EXECUTION" by the DB processing server A is registered in the process state of the DB storage area #1 and DB storage area #2. "IN STANDBY" is registered in the process state of the DB storage area #3, DB storage area #4, DB storage area #5 and DB storage area #6. The DB processing server A is registered as the belonging DB processing server for the DB storage area #1 and DB storage area #2. The DB processing server B is registered as the belonging DB processing server for the DB storage area #3 and DB storage area #4, and the DB processing server C is registered as the belonging DB processing server for the DB storage area #5 and DB storage area #6.

The substitution control information table shown in FIG. 9B is a table for the DB processing server A when the DB processing server B is down. Information registered in this table is the initial setting values changed in accordance with a takeover reception request from the system takeover function. The process state for the DB storage area #1 and DB storage area #2 is registered as "IN EXECUTION" by the DB processing server A. The process state for the DB storage area #4, DB storage area #5 and DB storage area #6 is registered as "IN STANDBY". The process state for the DB storage area #3 is registered as "IN SUBSTITUTION" because the process of the DB processing server B is inherited by the DB processing server from the DB processing server B. The belonging DB processing server of each DB storage area is the same as that in the normal case.

The information registered in the substitution control information table can be confirmed by an operation state confirmation command, a system state confirmation command of the system takeover function, or the like respectively of the database management system.

With reference to FIGS. 8A and 8B and FIGS. 9A and 9B, the operation of the database management system of the embodiment will be described.

With reference to FIGS. 8A and 8B, description will be made on a relation between the substitution destination information table and the operation of the process request receiving server 110 of the embodiment.

First, description will be made on the operation to be performed when the DB processing server B becomes down and a system takeover occurs. When the DB processing server B 112 becomes down and a system takeover occurs, a substitution notice 141 for the DB storage area #3 123 is transmitted from the DB processing server A 111 to the process request receiving server 110, and a substitution notice 142 for the DB storage area #4 124 is transmitted from the DB processing server C 113 to the process request receiving server 110. In the process request receiving server 110, the substitution destination judgement control part 310 receives the substitution notices 141 and 142 and updates the substitution destination information table 2602. The table before the update is shown in FIG. 8A and the table after the update is shown in FIG. 8B. The process request receiving server 110 changes the execution request destination for the DB storage area #3 123 from the DB processing server B to the DB processing server A upon reception of the substitution notice 141 for the DB storage area #3 123, and changes the execution request destination for the DB storage area #4 124 from the DB processing server B to the DB processing server C upon reception of the substitution notice 142 for the DB storage area #4 124.

Next, description will be made on the operation that an inquiry 130 is received from a user while the DB processing server B is down, the inquiry is analyzed, and it is decided that the access destination is the DB storage area #3. Since the DB processing server B, to which the DB storage area #3 belongs, is down, the process request control part 300 inquires the substitution destination judgement control part 310 about the process execution request destination for the DB storage area #3. The substitution destination judgement control part 310 refers to the substitution destination information table 2602 to determine the process execution request destination. Since the information registered in the substitution destination information table 2602 is as shown in FIG. 8B, the substitution destination judgement control part 310 determines the DB processing server A as the execution request destination for the DB storage area #3, and notifies it to the process request control part 300. As a result, the process request control part 300 transmits an execution request 153 to the DB processing server A 111.

With reference to FIGS. 9A and 9B, description will be made on the relation between the operation of the DB processing server A 111 and the substitution control information table according to the embodiment.

First, description will be made on the operation to be executed when the DB processing server B becomes down and a system takeover occurs. As the DA processing server B 112 becomes down and a system takeover occurs, the system takeover function 114 supplies the DB processing server A 111 with a system takeover reception request for the DB storage area #3 123. In the DB processing server A 111, the system takeover function cooperating control part 400 receives the takeover reception request for the DB storage area 3, and updates the substitute control information table 2702. The table before the update is shown in FIG. 9A and the table after the update is shown in FIG. 9B. Upon reception of the takeover reception request for the DB storage area #3 123, the DB processing server A 111 changes the process state of the DB storage area 3 from "IN STANDBY" to "IN SUBSTITUTION".

Next, description will be made on the operation that the DB processing server A 111 notifies the system takeover function 114 of the system state of the DB storage area #3 123. The system takeover function cooperating control part 400 of the DB processing server A 111 refers to the substitution control information table 2702 to identify the process state of the DB storage area #3, and notifies the system state to the system takeover function.

If the DB processing server B is under execution, the substitution control information table is as shown in FIG. 9A and the process state of the DB storage area #3 is "IN STANDBY". Therefore, the system takeover function cooperating control part 400 notifies the system takeover function of that the DB processing server A is the standby system for the DB storage area #3.

While the DB processing server B is down, the substitution control information table is as shown in FIG. 9B and the process state of the DB storage area #3 is "IN SUBSTITUTION". Therefore, the system takeover function cooperating control part 400 notifies the system takeover function of that the DB processing server A is the execution system for the DB storage area #3.

Next, description will be made on the operation to be executed when an execution request 153 for the DB storage area #3 123 is received from the process request receiving server 110 while the DB processing server B is down. Since the DB storage area 3 is the DB storage area to be substituted, the DB process execution control part 410 of the DB processing server A 111 inquires the substitution processing control part 420 about the belonging DB processing server of the DB storage area #3. The substitution processing control part 420 refers to the substitution control information table 2702 to identify the belonging DB processing server of the DB storage area #3.

Since the information registered in the substitution control information table 2702 is as shown in FIG. 9B, the substitution processing control part 420 identifies the DB processing server B as the belonging DB processing server for the DB storage area #3, and notifies it to the DB processing execution control part 410. Consequently, the DB processing execution control part 410 changes the execution environment to that of the DB processing server B, and accesses the DB storage area #3 to execute DB processing.

The execution environment is an operation environment in which the DB processing server executes the DB processing for the DB storage area, and includes, for example, data buffers, process attributions, a DB processing server state management table and the like.

The execution environment can be changed in accordance with definition information of a DB processing server, and the definition information can be identified by the name of a DB processing server.

Figure 2:
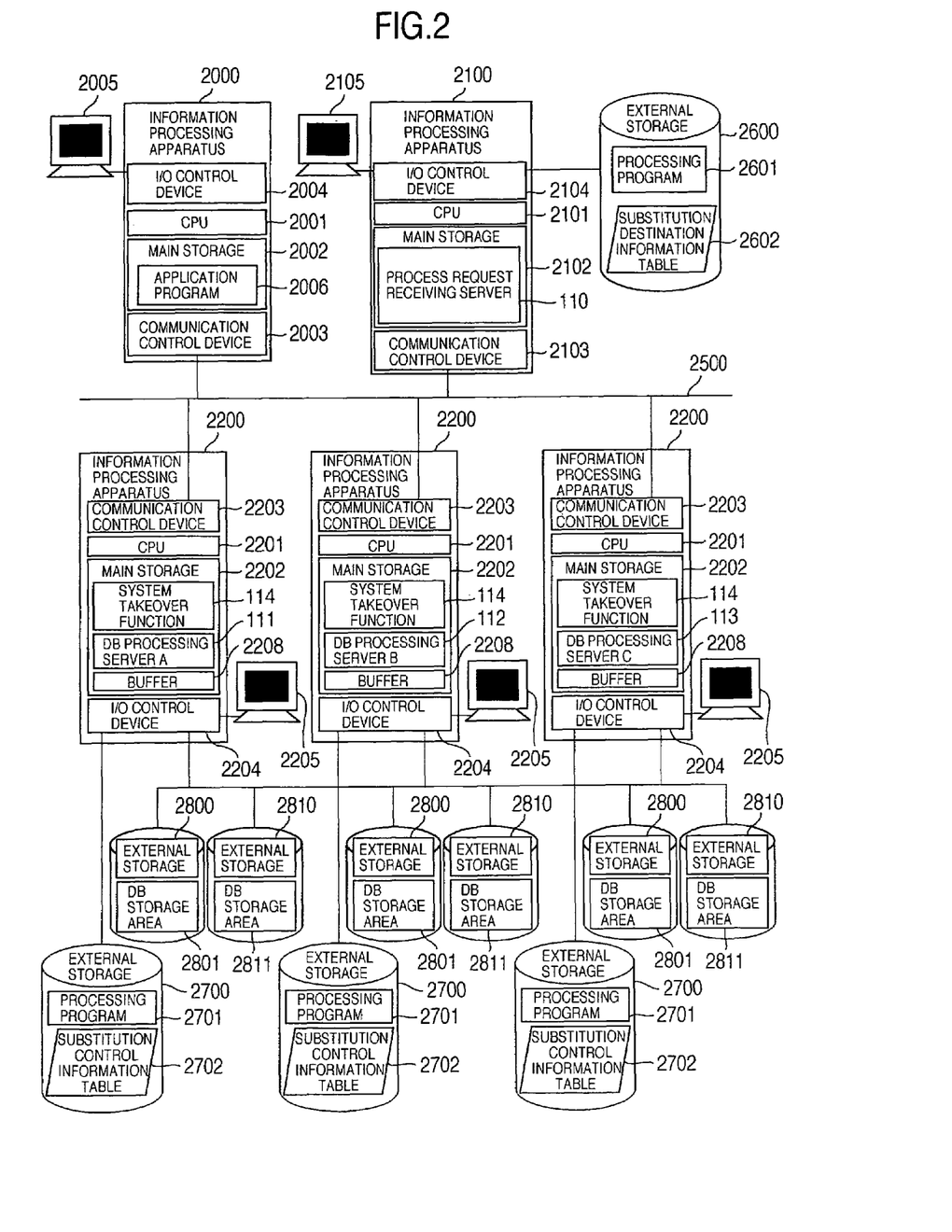
FIG. 2 is a diagram showing the configuration of a computer system according to the embodiment of the present invention.

The processes to be executed by the process request receiving server 110, DB processing server A 111, DB processing server B 112 and DB processing server C 113 of the embodiment are executed by a program in the computer system illustratively shown in FIG. 2. It is not limited, however, that this program is stored in the external storage device physically and directly connected to the computer system shown in FIG. 2. For example, the program may be stored in a computer readable storage medium such as a hard disk and a flexible disk. The program may also be stored in an external storage device connected via a network to another information processing apparatus different from the information processing apparatus constituting the computer system shown in FIG. 2.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A database processing method of performing data processing with a plurality of active database processing servers by divisionally storing a database in a plurality of database storage areas, with each database storage area allocated to a respective corresponding active database processing server, comprising:

registering substitution destination information in a table for the plurality of active database processing servers, representative of an allocation relation between each said database storage area and said database processing server presently corresponding to said database storage area;

issuing an instruction from a system takeover function, to change a database storage area allocation from a first database processing server corresponding to a first database storage area, to another active second database processing server presently corresponding to only a second database storage area, such that the second database processing server then corresponding to both the first database storage area and the second database storage area;

changing said substitution destination information in accordance with the instruction;

receiving a process request for accessing an access target database storage area;

judging whether or not the access target database storage area for processing the received process request is the first database storage area;

determining, when it is judged that the access target database storage area for processing the received process request is the first database storage area, a process request destination database processing server for the process request, by referring to said changed substitution destination information when processing for the access target database storage area is requested;

registering, in the database processing server, substitution control information necessary for executing processing for the access target database storage area;

changing an execution environment of a corresponding database processing server process by referring to said substitution control information when the process request whose target database area is the first database storage area is received in the database processing server; and executing database processing for the access target database storage area responsive to the process request.

2. The database processing method according to claim 1, comprising determining the relation between each said database processing server and said database storage area when a system is configured or the system is started up.

3. The database processing method according to claim 1, comprising changing a substitution destination information of said database storage area in accordance with an operation state of said database processing server.

4. The database processing method according to claim 1, comprising surveying one of said database storage area and said database processing server for failure, and requesting said system takeover function for a takeover when a failure occurs in said database processing server.

5. The database processing method according to claim 4, wherein in surveying said database storage area, a process state such as execution and substitution is acquired from the relation between said database storage area and said database processing server to judge whether there is a failure in said database processing server.

6. A database processing system performing data processing with a plurality of active database processing servers by divisionally storing a database in a plurality of database storage areas, with each database storage area allocated to a respective corresponding active database processing server, comprising:

a substitution destination information registering part adapted to register substitution destination information in a table for the plurality of active database processing servers, representative of an allocation relation between each said database storage area and said database processing server presently corresponding to said database storage area;

a database processor server changing part adapted to issue an instruction from a system takeover function, to change a database storage area allocation from a first database processing server corresponding to a first database storage area, to another active second database processing server presently corresponding to only a second database storage area, such that the second database processing server then corresponding to both the first database storage area and the second database storage area;

a substitution destination information changing part adapted to change said substitution destination information in accordance with the instruction;

a receiving part adapted to receive a process request for accessing an access target database storage area;

a judging part adapted to judge whether or not the access target database storage area for processing the received process request is the first database storage area;

a process request destination database server determining part adapted to determine, when it is judged that the access target database storage area for processing the received process request is the first database storage area, the process request destination database processing server for a process request, by referring to said changed substitution destination information when processing for the access target database storage area is requested;

a substitution control information registering part adapted to register, in the database processing server, substitution control information necessary for executing processing for the access target database storage area;

a changing part adapted to change an execution environment of a corresponding database processing server process by referring to said substitution control information when the process request whose target database area is the first database storage area is received in the database processing server; and an execution part adapted to execute database processing for the access target database storage area responsive to the process request.

7. The database management system according to claim 6, comprising a part for changing a substitution destination information of said database storage area in accordance with an operation state of said database processing server.

8. The database management system according to claim 6, comprising a surveying part for surveying one of said database storage area and said database processing server, and a takeover requesting part for requesting said system takeover function for a takeover when a failure occurs in said database processing server.

9. The database management system according to claim 8, wherein said part for surveying said database storage area, acquires a process state such as execution and substitution from the relation between said database storage area and said database processing server to judge whether there is a failure in said database processing server.

* * * * *